United States Patent
Moon et al.

(10) Patent No.: US 12,139,097 B2
(45) Date of Patent: Nov. 12, 2024

(54) SEAT BELT RETRACTOR HAVING VEHICLE SENSOR

(71) Applicant: Autoliv Development AB, Vargarda (SE)

(72) Inventors: Chan Ki Moon, Hwaseong-si (KR); Hyeon Kyu Kang, Hwaseong-si (KR); Ho Beom Yoon, Hwaseong-si (KR); Yong Kwan Song, Hwaseong-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 361 days.

(21) Appl. No.: 17/753,230

(22) PCT Filed: Aug. 27, 2020

(86) PCT No.: PCT/KR2020/011449
§ 371 (c)(1),
(2) Date: Feb. 24, 2022

(87) PCT Pub. No.: WO2021/040420
PCT Pub. Date: Mar. 4, 2021

(65) Prior Publication Data
US 2022/0289135 A1    Sep. 15, 2022

(30) Foreign Application Priority Data
Aug. 27, 2019    (KR) .................. 10-2019-0105224

(51) Int. Cl.
*B60R 22/40*    (2006.01)
*B60R 22/34*    (2006.01)

(52) U.S. Cl.
CPC .............. *B60R 22/40* (2013.01); *B60R 22/34* (2013.01); *B60R 2022/3402* (2013.01); *B60R 2022/401* (2013.01)

(58) Field of Classification Search
CPC ................. B60R 2022/401; B60R 2022/4808
See application file for complete search history.

(56) References Cited

U.S. PATENT DOCUMENTS 5,820,060 A * 10/1998 Yano ..................... B60R 22/405
                                                                     242/384.4
6,216,974 B1 * 4/2001 Lee ......................... B60R 22/40
                                                                     242/384.6
(Continued)

FOREIGN PATENT DOCUMENTS

DE         10220043 C1 * 10/2003 ............. B60R 22/41
DE     102007049200 A1 *  4/2009 ............. B60R 22/40
(Continued)

*Primary Examiner* — Sang K Kim
(74) *Attorney, Agent, or Firm* — DICKINSON WRIGHT PLLC

(57) ABSTRACT

A seat belt retractor including a fixed frame connected to a vehicle body; a spool mounted on the fixed frame so as to be rotatable about a shaft arranged in a predetermined direction, in which a seat belt is wound around the spool; a control disc connected to the shaft about which the spool rotates to rotate together with the spool, and having external teeth; a vehicle sensor unit for detecting a change in acceleration of a vehicle by a fluctuation of an inertial member to prevent the control disc from rotating; and an installation member coupled to a housing which is coupled to one sidewall of the fixed frame, wherein the vehicle sensor unit is directly and rotatably coupled to the installation member.

10 Claims, 7 Drawing Sheets

(56) References Cited

U.S. PATENT DOCUMENTS

| | | | |
|---|---|---|---|
| 6,443,382 B1 | 9/2002 | Bae | |
| 6,499,554 B1 | 12/2002 | Yano et al. | |
| 7,431,340 B2 * | 10/2008 | Midorikawa | B60R 21/013 |
| | | | 280/805 |
| 8,308,099 B2 * | 11/2012 | Ono | B60R 22/40 |
| | | | 242/384.4 |
| 8,469,302 B2 * | 6/2013 | Lee | B60R 22/40 |
| | | | 242/384.6 |
| 9,346,434 B2 * | 5/2016 | Clute | B60R 22/40 |
| 9,358,951 B2 * | 6/2016 | Matsuki | B60R 22/40 |
| 10,766,452 B2 * | 9/2020 | Bargmann | B60R 22/40 |
| 2004/0021027 A1 | 2/2004 | Kohlndorfer et al. | |
| 2010/0301153 A1 | 12/2010 | Lee et al. | |
| 2014/0001299 A1 * | 1/2014 | Meyer | B60R 22/34 |
| | | | 242/384.6 |
| 2014/0054405 A1 * | 2/2014 | Clark | B60R 22/34 |
| | | | 242/384 |

FOREIGN PATENT DOCUMENTS

| | | | | |
|---|---|---|---|---|
| DE | 102016202383 A1 * | 8/2017 | | B60R 22/40 |
| DE | 102016224952 A1 * | 6/2018 | | B60R 16/005 |
| KR | 10-0751773 B1 | 8/2007 | | |
| KR | 10-0835938 B1 | 6/2008 | | |
| KR | 101766844 B1 * | 8/2017 | | B60R 22/40 |
| KR | 10-2018-0101563 A | 9/2018 | | |

* cited by examiner

--PRIOR ART--

—PRIOR ART—

SEAT BELT RETRACTOR HAVING VEHICLE SENSOR

CROSS-REFERENCE TO RELATED APPLICATIONS

This application is a 35 U.S.C. § 371 national phase of PCT International Application No. PCT/KR2020/011449, filed Aug. 27, 2020, which claims the benefit of priority under 35 U.S.C. § 119 to Republic of Korea Patent Application No. 10-2019-0105224, filed Aug. 27, 2019, the contents of which are incorporated herein by reference in its entirety.

FIELD OF THE INVENTION

The present invention relates to a seat belt retractor, and more particularly, to a seat belt retractor having a vehicle sensor that detects a change in acceleration of the vehicle to prevent the seat belt from being withdrawn during deceleration of the vehicle.

BACKGROUND

In general, a vehicle is equipped with a seat belt safety device in a seat to ensure the safety of an occupant. The seat belt safety device includes a retractor configured to wind a strip-shaped seat belt on a spool or to withdraw the seat belt for restraining the occupant, and a buckle into which a tongue fixed at one end of the seat belt is detachably inserted.

The retractor prevents the occupant wearing the seat belt from being bounced forward or moved away from a seat due to driving inertia during sudden stop or rapid acceleration caused by a vehicle accident. Such a retractor includes a locking device that permits the withdrawal of the seat belt in a normal state when the occupant wears the seat belt, but suppresses further withdrawal of the seat belt when the withdrawal acceleration of the seat belt is detected due to a vehicle collision or the like.

For example, in Patent Document 1 and Patent Document 2 below, a retractor technique for controlling winding and unwinding operations of the seat belt is disclosed.

Meanwhile, when an acceleration exceeding a predetermined value is applied to the retractor in the horizontal direction, such as when the vehicle collision occurs, a vehicle sensor that detects the acceleration is operated to prevent the seat belt from being withdrawn by operating a locking device of the seat belt.

A vehicle sensor using a ball as an inertial member or an independent inertial member is generally known in the art.

The vehicle sensor includes an inertial member that moves in a dangerous situation where a deceleration higher than a normal deceleration of the vehicle is applied to the vehicle, and a sensor lever that interworks with external teeth of a control disc which is moved by the inertia member and rotates together with a spool of a seat belt retractor.

Such a seat belt retractor may be mounted on a vehicle body, such as a center pillar of the vehicle, a backrest of a seat, a rear pillar, etc. Accordingly, the mounting posture of the seat belt retractor may be variously changed according to structures of the center pillar, the seat back, the rear pillar, etc. That is, the seat belt retractor is not always mounted in a horizontal state, but may be mounted in a state inclined at a predetermined angle from the horizontal state to the left-right direction or the front-rear direction.

If the posture of the seat belt retractor is changed over a certain range as described above, the acceleration cannot be properly detected.

For example, when a retractor having a vehicle sensor has a posture that is inclined over a certain range from a horizontal state, the distance between a control disc and a sensor lever of a vehicle sensor becomes too close, so the sensor lever operates sensitively, so that the locking operation cannot be property performed.

In addition, for example, when a retractor having a vehicle sensor is mounted on a backrest of a seat, and the backrest of the seat is inclined forward of the vehicle, the sensor lever of the vehicle sensor is caught by the external teeth of the control disc, thereby restricting the rotation of the spool.

For this reason, when an occupant wants to wear a seat belt, it may not be possible to wear the seat belt because the rotation of the spool is restricted.

In order to solve the above problem, the applicant of the present invention has filed a patent application that discloses a seat belt retractor having a vehicle sensor with an improved fixing structure in Patent Document 3 below, which is now registered.

(Patent Document 0001) U.S. Pat. No. 6,499,554 (registered on Dec. 31, 2002)
(Patent Document 0002) U.S. Pat. No. 6,443,382 (registered on Sep. 3, 2002)
(Patent Document 0003) Korean Patent Registration No. 10-1766844 (issued Aug. 9, 2017)

Meanwhile, various vibrations are generated from a road surface or an engine while the vehicle is running.

When the vibration generated in the vehicle is transmitted to the seat belt retractor as described above, it is difficult for the vehicle sensor to accurately measure the acceleration.

In addition, among various parts applied to the seat belt retractor, the parts manufactured by using synthetic resin materials such as plastics amplify the vibration when the vibration is transmitted thereto, thereby generating noise upon operation.

SUMMARY

An object of the present invention is to solve the above-described problems and to provide a seat belt retractor having a vehicle sensor capable of preventing vibration generated in a vehicle from being transmitted to the vehicle sensor.

Another object of the present invention is to provide a seat belt retractor having a vehicle sensor capable of simplifying the fixing structure of the vehicle sensor, thereby improving workability during assembly work and reducing manufacturing cost.

In order to accomplish the above objects, a seat belt retractor having a vehicle sensor of the present invention includes: a fixed frame connected to a vehicle body; a spool mounted on the fixed frame so as to be rotatable about a shaft arranged in a predetermined direction, in which a seat belt is wound around the spool; a control disc connected to the shaft about which the spool rotates to rotate together with the spool, and having external teeth; a vehicle sensor unit for detecting a change in acceleration of a vehicle by a fluctuation of an inertial member to prevent the control disc from rotating; and an installation member coupled to a housing which is coupled to one sidewall of the fixed frame, wherein the vehicle sensor unit is directly and rotatably coupled to the installation member.

As described above, according to the seat belt retractor having the vehicle sensor of the present invention, the vehicle sensor unit is directly coupled to the installation member to remove a conventional sensor adapter, so that the number of parts for installing the vehicle sensor unit can be reduced, thereby improving workability during assembly work and reducing the manufacturing cost.

In addition, according to the present invention, the installation member provided with the vehicle sensor unit can be installed by rotating the installation member according to the installation angle of the housing by using the fixing flange formed on the outer peripheral surface of the installation member at predetermined angles.

Therefore, according to the present invention, there is an effect that it is not necessary to perform the work for forming teeth on the outer peripheral surface of the cover and the inner peripheral surface of the installation member.

In addition, according to the present invention, since the vehicle sensor unit is directly coupled to the housing through the installation member, the vibration generated in the vehicle can be prevented from being amplified through the parts formed of synthetic resin materials, so that the vibration and operation noise can be minimized.

DETAILED DESCRIPTION

Hereinafter, a seat belt retractor having a vehicle sensor according to a preferred embodiment of the present invention will be described in detail with reference to the accompanying drawings.

In the following description, terms indicating directions such as 'left', 'right', 'front', 'rear', 'upward', and 'downward' refer to directions corresponding to the left, right, front, rear, upward and downward directions of a vehicle.

First, an overall configuration of a seat belt retractor having a vehicle sensor will be briefly described with reference to FIGS. 1 to 3.

Figure 1:
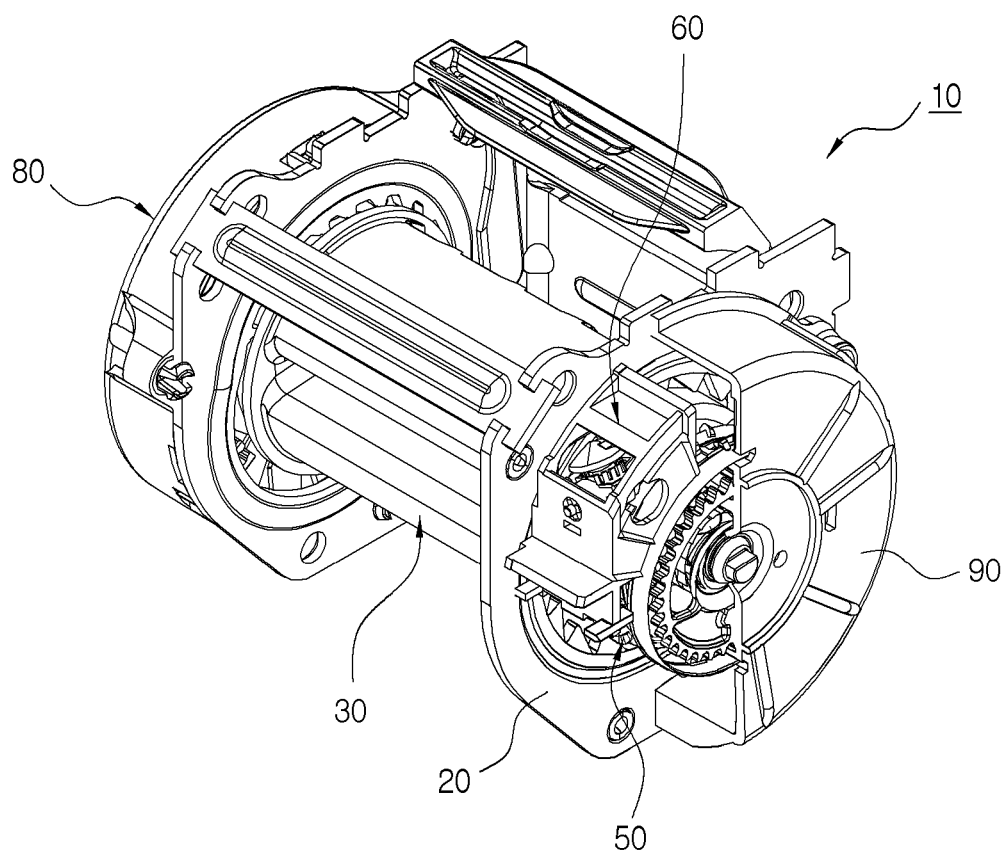
FIG. 1 is a perspective view of a seat belt retractor having a vehicle sensor.
Figure 2:
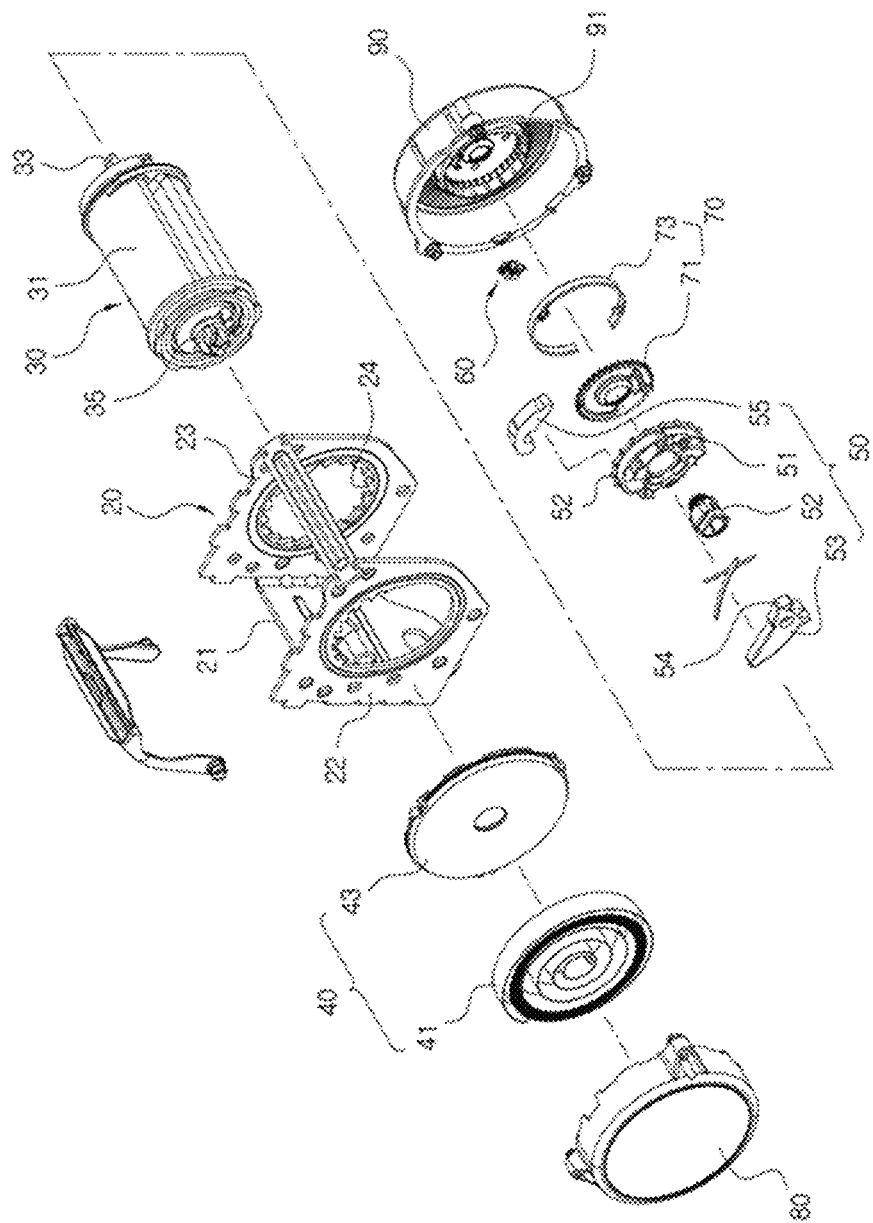
FIG. 2 is an exploded perspective view of the retractor shown in FIG. 1.
Figure 3:
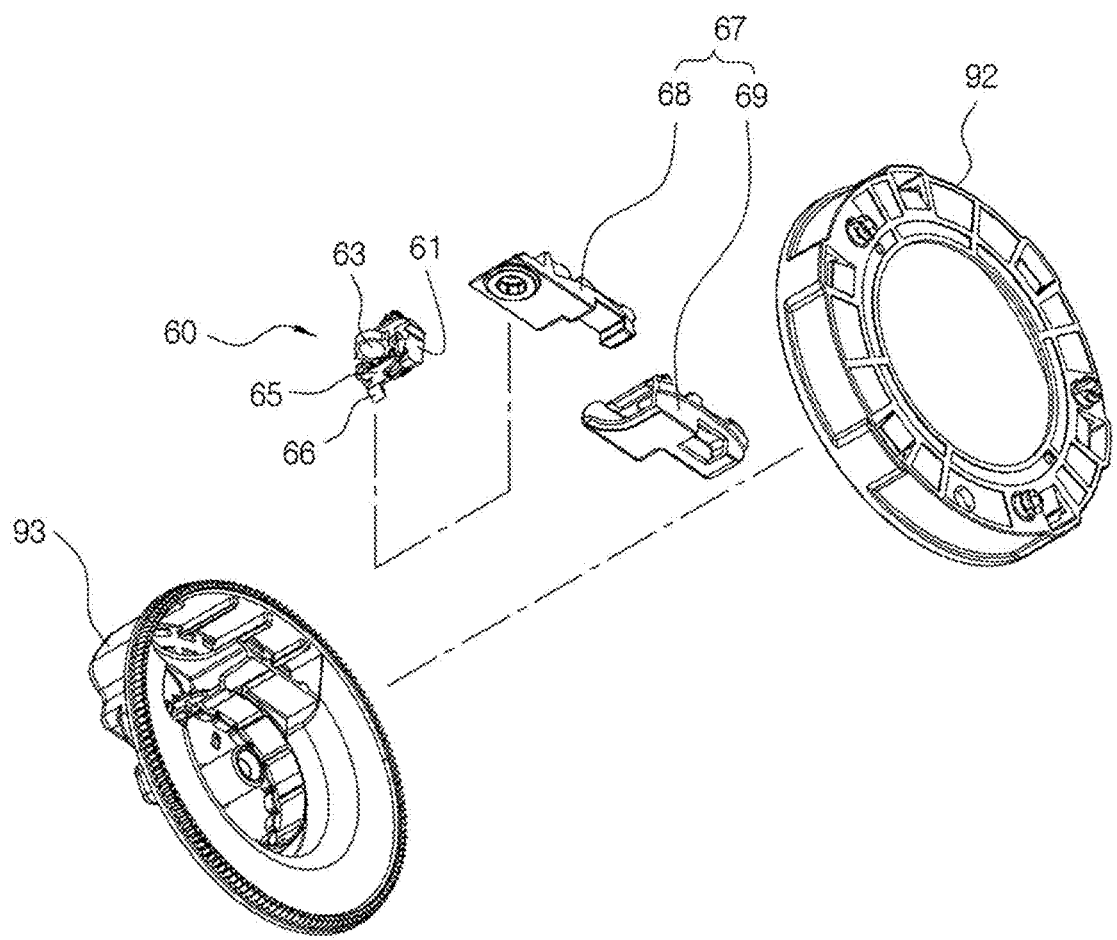
FIG. 3 is an enlarged perspective view of a vehicle sensor unit.

FIG. 1 is a perspective view of the seat belt retractor having a vehicle sensor, FIG. 2 is an exploded perspective view of the retractor shown in FIG. 1 and FIG. 3 is an enlarged perspective view of a vehicle sensor unit.

As shown in FIGS. 1 and 2, the seat belt retractor 10 having the vehicle sensor may include a fixed frame 20, a spool 30, a winding spring unit 40, a locking unit 50, a vehicle sensor unit 60, an anti-locking unit 70, and left and right housings 80 and 90.

The fixed frame 20 may be a part on which the spool 30, the winding spring unit 40, the locking unit 50, the vehicle sensor unit 60, the anti-locking unit 70, and the left and right housings 80 and 90 are mounted. This is where the back is mounted. The fixed frame 20 may include a base wall 21 mounted on a vehicle body, such as a center pillar, a rear pillar, and a backrest of a seat, and both side walls 22 and 23 through which the spool 30 is rotatably installed.

The spool 30 may be a part where the seat belt is wound. The spool 30 may include a cylindrical body 31 rotatably operated with respect to the fixed frame 20 and spool shafts 33 and 35 protruding from centers of both sides of the cylindrical body 31. The two spool shafts 33 and 35 may be rotatably coupled directly or indirectly to centers of housings 80 and 90 fixed to both side walls 22 and 23 of the fixed frame 20.

The winding spring unit 40 may include a torsion spring 41 accommodated in the left housing 80 and a spring seat 43 making contact with a side 13 of the fixed frame 20 so as to generate a restoring force for winding up the withdrawn seat belt.

The locking unit 50 may stop the rotation of the spool 30 when the withdrawal acceleration of the seat belt has a value greater than or equal to a predetermined value. The locking unit 50 may include a control disc 51, a latch 53, and a locking arm 55.

The control disc 51 may be coupled to a spool shaft 33 of the spool 30 via a bush 52 and may rotate together with the spool 30, and external teeth 52 may be formed on an outer peripheral surface of the control disc 51.

The latch 53 may be pivotally installed between the spool 30 and the control disc 51, and may rotate together with the spool 30 and the control disc 51 in a normal state. The latch 53 may include a latch tooth portion 54 that pivots upon rapid deceleration of the vehicle and is caught by a tooth portion 24 formed on the fixed frame 20.

The locking arm 55 may be installed on the other side of the control disc 51 so as to rotate together with the control disc 51, and may serve as an inertial mass upon rapid deceleration of the vehicle so that the locking arm 55 may be locked with a locking column 91 formed inside the housing 90.

The vehicle sensor unit 60 may have a function of preventing the rotation of the spool 30 by restraining the control disc 51 while being operated upon rapid deceleration of the vehicle.

For this purpose, the vehicle sensor unit 60 may include a carrier part 61, an inertial member 63 and a sensor lever 65 as shown in FIGS. 2 and 3.

The inertial member 63 may be arranged upright on a contact surface of the carrier part 61 and may be tilted within the carrier part 61 upon rapid deceleration of the vehicle.

The sensor lever 65 may be coupled to the inertial member 63 in a form-fit manner, and may have a locking tip 66 that is caught by the outer teeth 52 of the control disc 51. The carrier part 61 may be coupled to the inside of the housing 90 through a sensor adapter 67.

That is, the vehicle sensor unit 60 may be fixedly coupled to a predetermined position of the right housing (hereinafter referred to as 'housing') 90 through the sensor adapter 67.

For example, as shown in FIG. 3, the sensor adapter 67 may include a coupling member 68 to which the vehicle sensor unit 60 is coupled and a weight member 69 coupled to the coupling member 68 to apply a load to the coupling member 68. The sensor adapter 67 may be fixedly coupled between a coupler 92 coupled to the outer surface of the housing 90 and a cover 93 for shielding the outer surface of the coupler 92.

Thus, the sensor adapter 67 may be inserted into an installation space defined by inner side walls of the cover 93 and fixed inside the cover 93. As the coupler 92 and the housing 90 are coupled to each other in a state in which the cover 93 and the coupler 92 are coupled to each other, the sensor adapter 67 may be disposed outside the housing 90.

The vehicle sensor unit 60 may be coupled to the sensor adapter 67 as a coupling protrusion formed at the rear end of the carrier part 61 is coupled to a coupling hole formed in the coupling member 68, and the installation angle of the vehicle sensor unit 60 may be adjusted by rotating about the coupling protrusion.

The coupling member 68 may be formed of a synthetic resin material such as plastic, and the weight member 69 may be formed of a metal material having a predetermined weight to reduce the influence by the vibration generated in the vehicle.

That is, conventionally, the influence of the vibration generated in the vehicle is reduced by providing the weight member 69 to the sensor adapter 67 to apply a constant load to the vehicle sensor unit 60.

As described above, in the seat belt retractor according to the prior art, a sensor adapter including a coupling member made of synthetic resin and a weight member made of metal is coupled to the outside of the housing in order to reduce the effect of vibration generated in the vehicle. It is attached to the cover and installation member.

Therefore, the seat belt retractor according to the related art has a problem that the number of parts is unnecessarily increased so that the manufacturing cost is increased and workability is deteriorated during assembly work.

In addition, the seat valve retractor according to the related art has a limitation for removing the influence of vibration generated in the vehicle because it uses only the load of the weight member to remove the influence of vibration.

In order to solve the above problem, according to the present invention, the sensor adapter is removed and the vehicle sensor unit is directly coupled to the housing separately from the cover installed on the outer surface of the housing, thereby minimizing the influence of vibration generated in the vehicle.

Hereinafter, the configuration of the seat belt retractor, to which the vehicle sensor is applied, according to the present invention will be described in detail with reference to FIG. 4.

Figure 4:
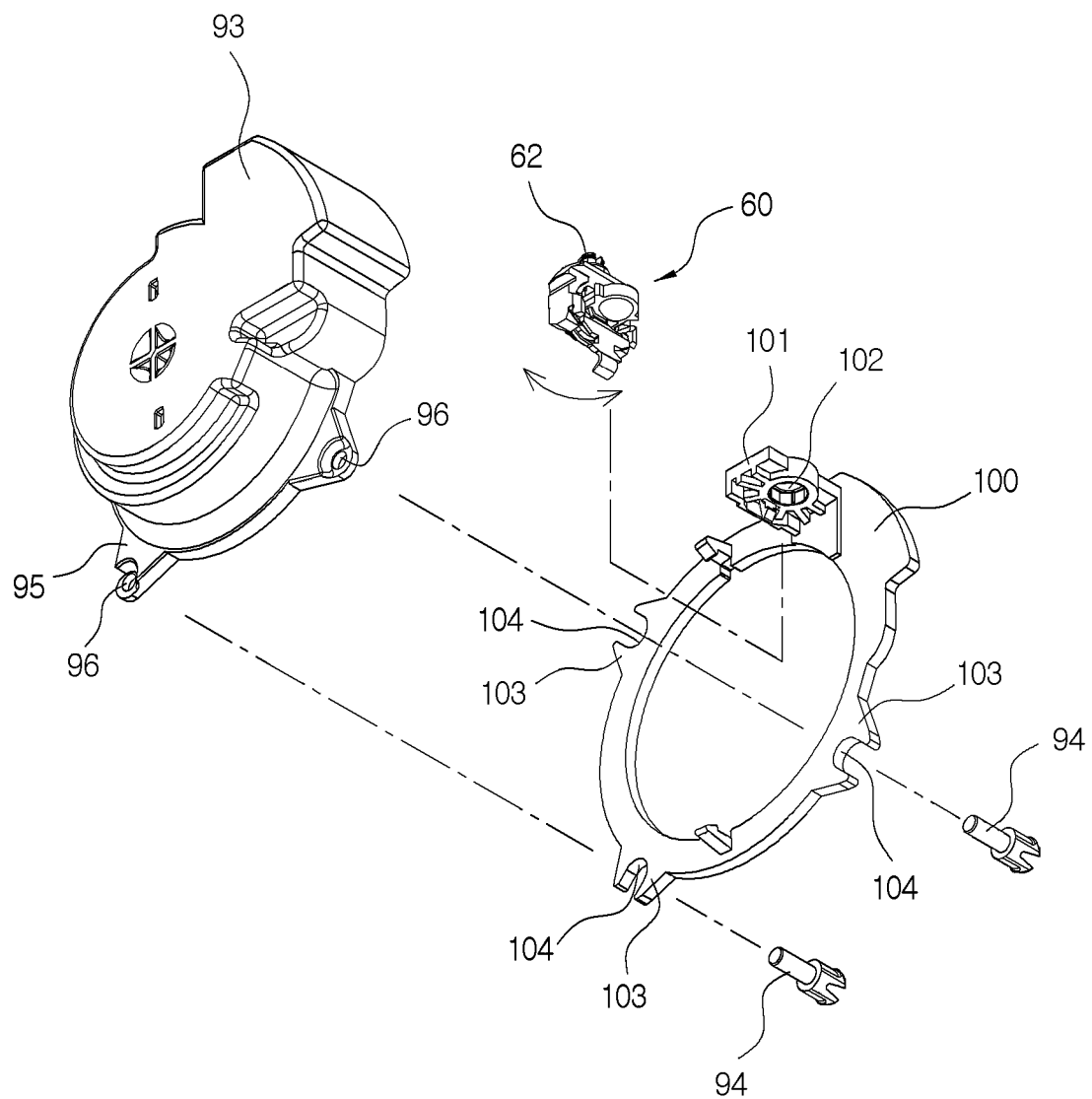
FIG. 4 is an exploded perspective view showing an assembly structure of a vehicle sensor unit applied to a seat belt retractor according to a first embodiment of the present invention.

FIG. 4 is an exploded perspective view showing an assembly structure of a vehicle sensor unit applied to a seat belt retractor according to a first embodiment of the present invention.

As shown in FIG. 4, the vehicle sensor unit 60 may be coupled to the installation member 100 installed on the outer surface of the housing 90, the installation member 100 may be formed in a substantially ring shape.

That is, according to the present embodiment, the conventional sensor adapter 67 may be removed, and the ring-shaped installation member 100 may be coupled to the housing 90 to simplify the assembly structure of the vehicle sensor unit 60.

For this purpose, an installation wall 101 may protrude from the outer surface of the installation member 100, and the vehicle sensor unit 60 may be fixedly coupled to the installation member 100 by coupling the coupling protrusion 62 formed at one end of the carrier part into an installation hole 102 formed in the installation wall 101.

Fixing flanges 103 may be formed on the outer peripheral surface of the installation member 100 at preset angles, concave grooves 104 may be formed in the fixing flanges 103 respectively, and fixing protrusions 94 protruding from the outer surface of the housing 90 or penetrating through the outer surface of the housing 90 may be disposed in the concave grooves 104.

The preset angle may be set to rotate and install the vehicle sensor unit 60 so that the vehicle sensor unit 60 maintains the horizontal state according to the installation angle of the fixed frame 20 and the housing 90.

For example, the preset angle may be set to about 90° or 180°.

Figure 5:
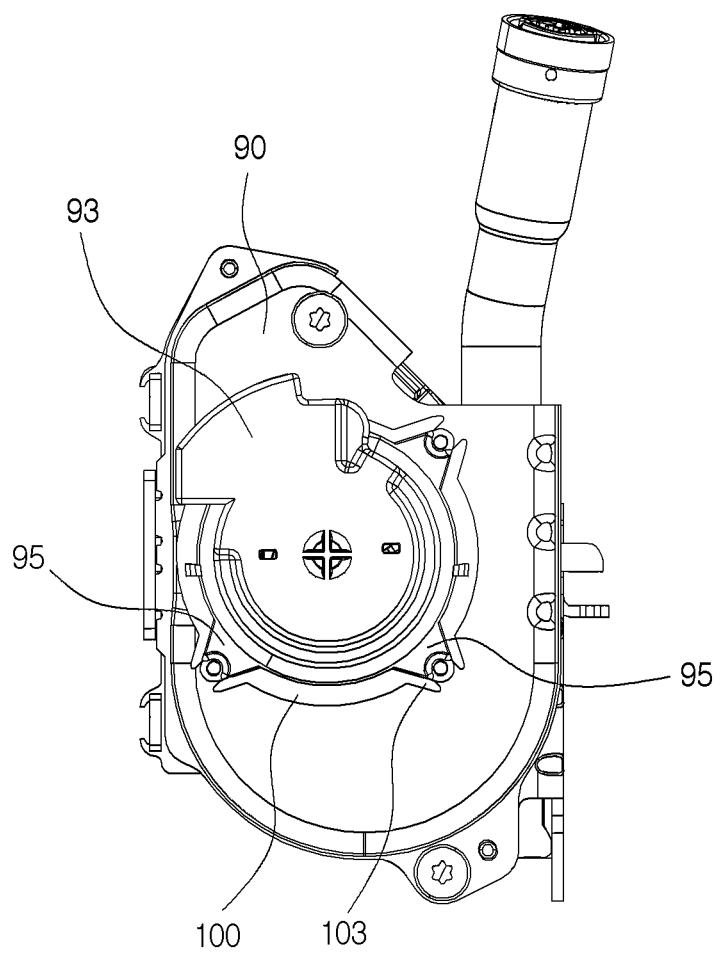
FIGS. 5 and 6 are views showing a state in which a vehicle sensor unit is installed according to an installation angle of a fixed frame.
Figure 6:
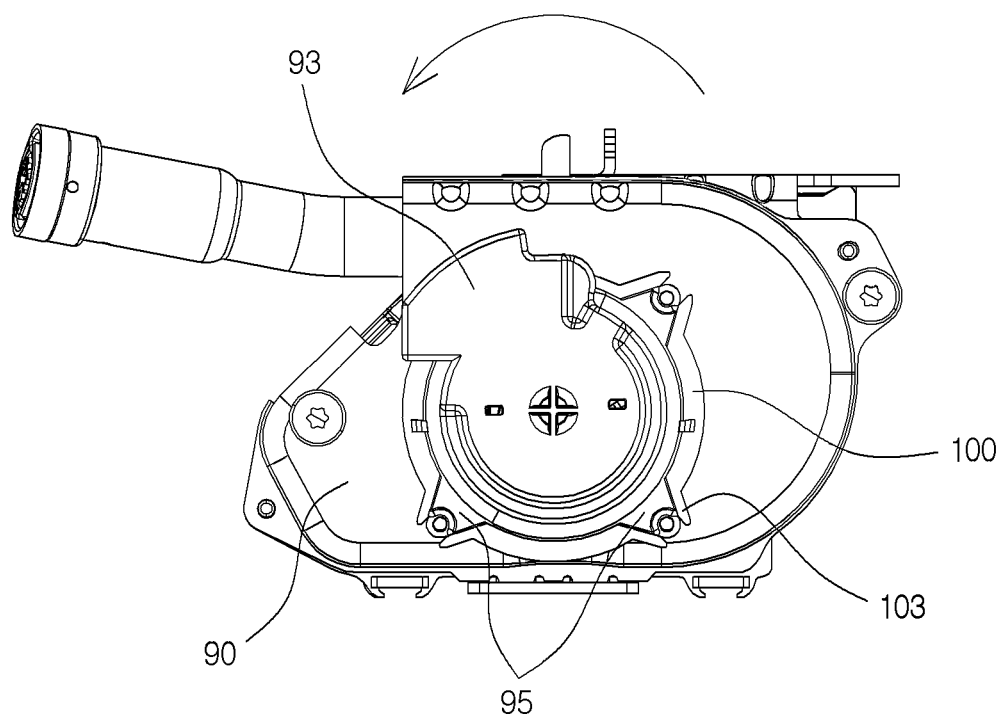

FIGS. 5 and 6 are views showing a state in which the vehicle sensor unit is installed according to the installation angle of the fixed frame.

FIG. 5 shows a state in which a base wall 21 of the fixed frame 20 is vertically installed, and FIG. 6 shows a state in which the base wall 21 is rotated by about 90° in the counterclockwise direction so that the base wall 21 is horizontally installed.

As shown in FIGS. 5 and 6, when the preset angle is set to 90°, the present invention can horizontally maintain the vehicle sensor unit by rotating the installation member according to the installation angle of the fixed frame.

However, the present invention is not necessarily limited thereto, and the preset angle may be set to 45° or 30°, or may be subdivided such as 5° or 10° according to the installation angle of the fixed frame.

Referring again to FIG. 4, the cover 93 may have a substantially cylindrical shape with an open inner surface in contact with the installation member 100, a flange portion 95 having a substantially circular shape may be formed on the outer peripheral surface of the cover 93, and a plurality of coupling holes 96 coupled with the fixing protrusions 94 may be formed in the flange portion 95 at preset angles.

However, the present invention is not necessarily limited thereto. For instance, the front end of the fixing protrusion 94 may be integrally formed with the flange portion 95, and the rear end of the fixing protrusion 94 may have a hook shape coupled to the housing 90.

As described above, according to the present invention, the structure of the installation member may be simply changed and the conventional sensor adapter may be removed by directly coupling the vehicle sensor unit to the installation member, so that the number of parts for installing the vehicle sensor unit can be reduced, thereby improving the workability and reducing the manufacturing cost.

In addition, according to the present invention, the installation member provided with the vehicle sensor unit may be installed by rotating the installation member according to the installation angle of the housing by using the fixing flanges formed on the outer peripheral surface of the installation member at preset angles.

Thus, according to the present invention, it is not necessary to perform the conventional work for forming teeth on the outer peripheral surface of the cover and the inner peripheral surface of the installation member.

In addition, according to the present invention, the vehicle sensor unit can be directly installed on the housing through the installation member so that the vibration generated in the vehicle can be prevented from being amplified when transmitted through the parts formed of synthetic resin materials, thereby minimizing the vibration and operation noise.

Meanwhile, although the installation member has been explained as to have a ring shape in the first embodiment, the present invention is not limited thereto.

Figure 7:
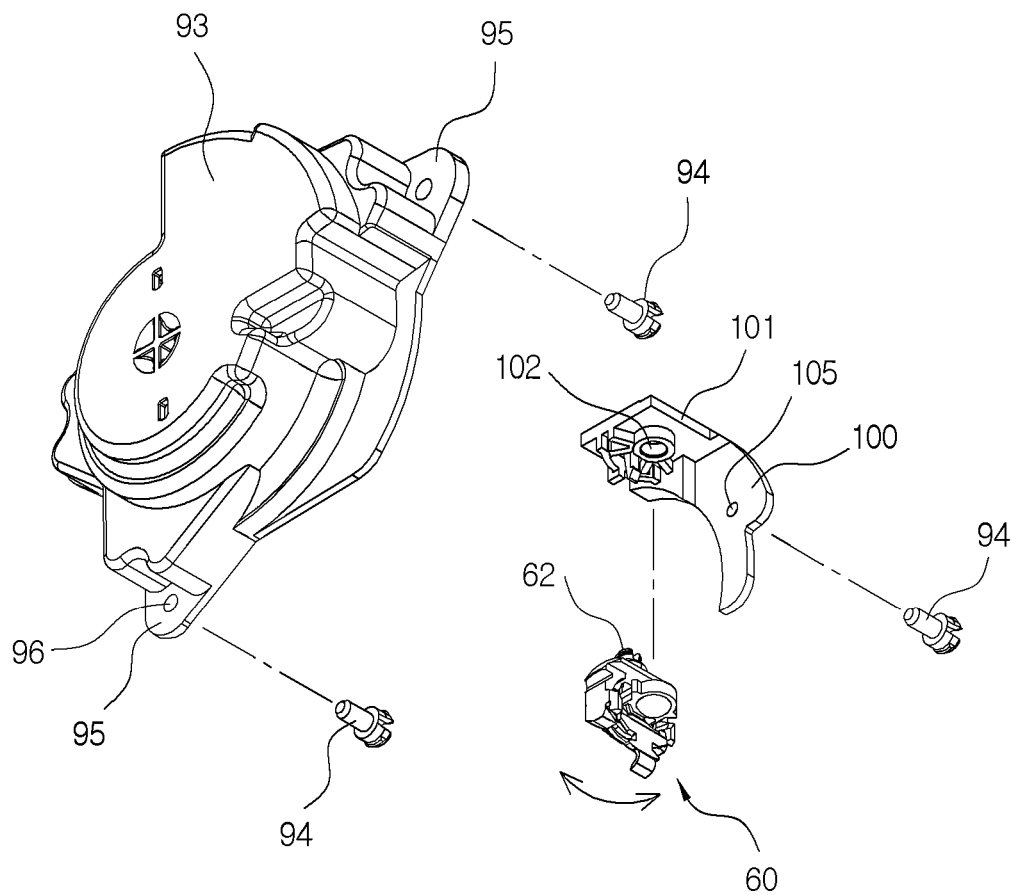
FIG. 7 is an exploded perspective view showing a coupling structure of a vehicle sensor unit applied to a seat belt retractor according to a second embodiment of the present invention.

FIG. 7 is an exploded perspective view showing an assembly structure of a vehicle sensor unit applied to a seat belt retractor according to a second embodiment of the present invention.

In the second embodiment of the present invention, as shown in FIG. 7, the installation member 100 may be formed in an arc shape corresponding to a part of a ring shape.

That is, in the present embodiment, the installation member 100 is formed in an arc shape, and a through hole 105 into which the fixing protrusion 94 is coupled is formed in the installation member 100, so that the installation member 100 can be fixed to the housing 90.

As described above, according to the present invention, the assembly structure of the installation member and the vehicle sensor unit can be simplified by installing the vehicle sensor unit on the installation member having the arc shape, thereby improving workability during the assembly work for the retractor, and reducing the manufacturing cost by reducing the number of parts.

Meanwhile, although it has been described in the first embodiment that the installation member 100 and the cover 93 are formed in the housing 90 or fixed together by the fixing protrusion 94 coupled through the housing 90, the present invention is not necessarily limited thereto.

According to the present embodiment, the cover 93 is coupled to the housing 90 by coupling the fixing protrusion 94 into the coupling hole 96 formed in a plurality of flange portions 95 in a state in which the cover 93 is separated from the installation member 100.

For example, vibration may be generated from the engine and road surface when driving the vehicle on a road, particularly, on rough roads with gravels or unpaved roads, and parts formed of synthetic resin materials may be severely deformed due to external conditions such as the temperature, etc., so that the vibration may be amplified.

However, according to the present embodiment, the arc-shaped mounting member 100 provided with the vehicle sensor unit 60 and the cover 93 formed of the synthetic resin material are separately installed on the housing 90, so that the vibration generated in the vehicle may be perfectly blocked from being amplified through the cover 93 and transmitted to the vehicle sensor unit 60.

Accordingly, the present invention can prevent a malfunction of the vehicle sensor due to the vibration by blocking the transmission of vibration generated in the vehicle to the vehicle sensor, and can minimize the operation noise.

Although the present invention made by the present inventor has been described in detail with reference to the above embodiments, the present invention is not limited to the above embodiments, but may be variously modified within the scope of the present invention.

The present invention can be applied to a technique for a seat belt retractor having a vehicle sensor that reduces the number of parts for installing a vehicle sensor in a seat belt retractor, thereby improving workability during assembly work and reducing manufacturing costs.

While the above description constitutes the preferred embodiment of the present invention, it will be appreciated that the invention is susceptible to modification, variation and change without departing from the proper scope and fair meaning of the accompanying claims.

The invention claimed is:

1. A seat belt retractor having a vehicle sensor, the seat belt retractor comprising:
a fixed frame connected to a vehicle body;
a spool mounted on the fixed frame so as to be rotatable about a shaft arranged in a predetermined direction, in which a seat belt is wound around the spool;
a control disc connected to the shaft about which the spool rotates to rotate together with the spool, and having external teeth;
a vehicle sensor unit for detecting a change in acceleration of a vehicle by a fluctuation of an inertial member to prevent the control disc from rotating; and
an installation member coupled to a housing which is coupled to one sidewall of the fixed frame,
wherein the vehicle sensor unit is directly and rotatably coupled to the installation member.

2. The seat belt retractor of claim 1, wherein an installation wall is provided on an outer surface of the installation member, and
the vehicle sensor unit includes:
a carrier part rotatably coupled to the installation wall such that an installation angle of the vehicle sensor unit is adjustable;
the inertial member disposed upright on a contact surface of the carrier part and tilted within the carrier part upon sudden deceleration of the vehicle; and
a sensor lever coupled to the inertial member and having a locking tip latched to the external teeth of the control disc.

3. The seat belt retractor of claim 2, wherein the installation member has a ring shape, and
a plurality of fixing flanges are provided on an outer circumferential surface of the installation member at predetermined angles such that an installation angle of the installation member installed on an outer surface of the housing is adjustable based on an installation angle of the fixed frame.

4. The seat belt retractor of claim 2, wherein the installation member has an arc shape, and
the installation member is provided with a plurality of fixing flanges such that an installation angle of the installation member installed on the housing is adjustable based on an installation angle of the fixed frame.

5. The seat belt retractor of claim 1, further comprising a cover for shielding an outer surface of the installation member,
wherein the cover is coupled to the housing by a fixing protrusion which protrudes from an outer surface of the housing or passes through the housing.

6. The seat belt retractor of claim 5, wherein the installation member is coupled to the housing together with the cover by the fixing protrusion.

7. The seat belt retractor of claim 5, wherein the installation member is coupled to the housing by a separate fixing protrusion other than a fixing protrusion for coupling the cover to the housing to prevent a vibration generated from the vehicle from being transmitted to the vehicle sensor unit through the cover.

8. A seat belt retractor having a vehicle sensor, the seat belt retractor comprising:
a fixed frame connected to a vehicle body;
a spool mounted on the fixed frame so as to be rotatable about a shaft arranged in a predetermined direction, in which a seat belt is wound around the spool;
a control disc connected to the shaft about which the spool rotates to rotate together with the spool, and having external teeth;

a vehicle sensor unit for detecting a change in acceleration of a vehicle by a fluctuation of an inertial member to prevent the control disc from rotating; and an installation member coupled to a housing which is coupled to one sidewall of the fixed frame; and a cover for shielding an outer surface of the installation member, wherein the vehicle sensor unit is directly and rotatably coupled to the installation member, wherein the cover is coupled to the housing by a fixing protrusion which protrudes from an outer surface of the housing or passes through the housing, wherein the installation member is coupled to the housing by a separate fixing protrusion other than a fixing protrusion for coupling the cover to the housing to prevent a vibration generated from the vehicle from being transmitted to the vehicle sensor unit through the cover.

9. The seat belt retractor of claim 8, wherein the installation member is coupled to the housing together with the cover by the fixing protrusion.

10. The seat belt retractor of claim 1, further comprising an installation wall protruding from an outer surface of the installation member to receive the sensor unit.

* * * * *